United States Patent
Kulkarni (12)

(10) Patent No.: US 9,443,327 B2
(45) Date of Patent: Sep. 13, 2016

(54) RENDERING AND UN-RENDERING USING PROFILE REPLACEMENT

(75) Inventor: Manish S. Kulkarni, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1010 days.

(21) Appl. No.: 12/187,226

(22) Filed: Aug. 6, 2008

(65) Prior Publication Data

US 2014/0035944 A1    Feb. 6, 2014

(51) Int. Cl.
*G06T 11/00*    (2006.01)

(52) U.S. Cl.
CPC .................... *G06T 11/001* (2013.01)

(58) Field of Classification Search
CPC ...... G09G 5/02; G09G 5/06; G09G 2340/06; H04N 1/60; H04N 1/6058; H04N 1/6061; H04N 1/6002; H04N 1/6005; H04N 1/6008
See application file for complete search history.

(56) References Cited

U.S. PATENT DOCUMENTS

| | | | |
|---|---|---|---|
| 6,435,657 B1 | 8/2002 | Couwenhoven et al. | |
| 6,992,683 B2 * | 1/2006 | Shin et al. | 345/589 |
| 7,330,286 B2 * | 2/2008 | Fukasawa | 358/1.9 |
| 7,468,820 B2 | 12/2008 | Ng et al. | |
| 2004/0246526 A1 | 12/2004 | Ishigami et al. | |
| 2005/0185837 A1 | 8/2005 | Takano et al. | |
| 2005/0195415 A1 | 9/2005 | De Baer | |
| 2006/0007460 A1 | 1/2006 | Bogdanowicz et al. | |
| 2006/0280360 A1 | 12/2006 | Holub | |
| 2007/0046958 A1 | 3/2007 | Hoof et al. | |
| 2007/0076260 A1 | 4/2007 | Upton | |
| 2008/0123948 A1 | 5/2008 | De Baer | |

OTHER PUBLICATIONS

U.S. Appl. No. 11/689,342, Kulkarni et al., filed Mar. 21, 2007.
FAQ-HDR images for Photography, Sep. 7, 2006, http://www.hdrsoft.com/resources/dri.html, 12 pages.
U.S. Patent Office, U.S. Appl. No. 11/689,342, filed Mar. 21, 2007, in Office Action mailed Apr. 30, 2010, 27 pages, to be published by USPTO.
U.S Patent Office, U.S. Appl. No. 11/689,342, filed Mar. 21, 2007, in Office Action mailed Oct. 18, 2010, 28 pages, to be published by USPTO.
Garret M. Johnson et al., "Rendering HDR Images", Munsell Color Science Laboratory, Chester F. Carlson Center for Imaging Science, Rochester Institute of Technology, Rochester, New York, USA, 7 pages, 2003.

* cited by examiner

*Primary Examiner* — Antonio A Caschera
(74) *Attorney, Agent, or Firm* — Shook, Hardy & Bacon L.L.P.

(57) ABSTRACT

Methods, systems, and apparatus, including medium-encoded computer program products, can perform rendering and un-rendering using profile replacement. A computer implemented method includes obtaining source image data associated with a source input-referred color space, transforming the source image data to intermediate image data associated with an intermediate input-referred color profile, applying a rendering operation to the intermediate image data by associating the intermediate image data with an intermediate output-referred color profile, and transforming the intermediate image data to destination image data associated with a destination output-referred color space using the intermediate output-referred color profile. The method further includes making available for output the destination image data.

21 Claims, 4 Drawing Sheets

RENDERING AND UN-RENDERING USING PROFILE REPLACEMENT

BACKGROUND

The present disclosure relates to color conversion techniques and color management systems and software.

Devices that are capable of representing image data (e.g., monitors, printers, scanners, cameras) often have significant variations in color gamut, the range of colors producible by the device. To accommodate this range in device gamuts, a variety of color spaces, and color management systems and techniques have been developed. Color management enables different color space values to be mapped from one device's gamut to another's using color profiles, which define how color information is transformed into or out of a standard reference space called a profile connection space.

Using color management, a human's perception of color from one device representation to another can be kept close to constant, despite the variation in color capabilities of different devices. To assist in color management, the Commission Internationale de L'Eclairage (CIE) has defined various color spaces that are device independent and encompass the full gamut of human vision, and can thus be used as profile connection spaces. Typical profile connection spaces in color management systems include CIEXYZ and CIELAB. LAB space is a color space having a luminance channel, L, and opponent color channels, A (green→red) and B (blue→yellow).

A color profile defines how to transform color information from one color space to another, such as from a device-dependent color space into a profile connection space, or the reverse. Many color profiles also conform to a defined color profile architecture, which provides flexibility in their use. For example, the International Color Consortium (ICC) provides a defined color profile architecture commonly used in many color management systems. ICC profiles have been developed for many different color spaces.

Image states represent the color and lighting characteristics associated with viewing or capturing the images. The two major categories of image states are input-referred and output-referred. Input-referred image states are generally associated with the color and lighting characteristics in the environment of captured scenes. Output-referred image states are generally associated with the color and lighting characteristics of images when viewed in environments with much more limited dynamic range, such as movie theaters or computer monitors. "Input-referred" is a more general term that encompasses image states, such as "scene-referred," which typically relates to capturing the natural, three-dimensional world and "original-referred," which typically relates to capturing two-dimensional artwork or photographs. Output referred includes print-referred, display-referred, and others.

Input devices, such as a digital camera, initially capture images in the form of varying intensities of light. The values of the intensities are generally proportional to the light levels of the scene. Input-referred is an image state associated with image data that is associated with the light levels of the scene. Other types of input-referred image states include focal-plane-referred, which is associated with the view at the focal plane after passing through lenses of a camera. Often the input-referred images have a high dynamic range of light intensities. For example, a picture captured outside may capture light from the sun and a very dark shadow in the same image, which leads to a high dynamic range.

When a captured image needs to be displayed on a monitor, by a printer, or using some other output device, the output devices often have much lower dynamic ranges. A dynamic range adjustment must be done to the image to allow the output device to display the image properly. An output-referred image can result when dynamic range adjustments are done on an input-referred image. Adjusting the dynamic range, usually by some type of compression algorithm, is called rendering. The reverse (converting an output-referred image to an input-referred image) is called un-rendering. In many cases, un-rendering is not completely accurate because information about the image is lost in the rendering process, but an approximated input-referred image can be obtained. In some cases, such as in the case of video, where dynamic range compression is not really done to a great extent and gamma adjustments are the main changes between input-referred and output-referred images, the un-rendering can be fairly accurate.

SUMMARY

This specification describes technologies relating to rendering and un-rendering using profile replacement.

In general, one aspect of the subject matter described in this specification can be embodied in a computer implemented method that includes obtaining source image data associated with a source input-referred color space, transforming the source image data to intermediate image data associated with an intermediate input-referred color profile, applying a rendering operation to the intermediate image data by associating the intermediate image data with an intermediate output-referred color profile, and transforming the intermediate image data to destination image data associated with a destination output-referred color space using the intermediate output-referred color profile. The method further includes making available for output the destination image data. Other embodiments of this aspect include corresponding systems, apparatus, and computer program products.

In general, another aspect of the subject matter described in this specification can be embodied in a computer implemented method that includes obtaining source image data associated with a source output-referred color space, transforming the source image data to intermediate image data associated with an intermediate output-referred color profile, applying an un-rendering operation to the intermediate image data by associating the intermediate image data with an intermediate input-referred color profile, and transforming the intermediate image data to destination image data associated with a destination input-referred color space using the intermediate input-referred color profile. The method further includes making available for output the destination image data. Other embodiments of this aspect include corresponding systems, apparatus, and computer program products.

These and other embodiments can optionally include one or more of the following features. The intermediate input-referred color profile and the intermediate output-referred color profile can differ by gamma curves associated with each, and the destination output-referred color space can be selected based on a current task in an imaging workflow. The imaging workflow can be one of a digital cinema workflow, a video workflow, and a camera negative workflow. The rendering operation can include a gamma adjustment. The intermediate input-referred color profile can be based on a High-Definition Television color space defined in an International Telecommunication Union Radiocommunication Sector Recommendation BT.709, and the intermediate output-referred color profile can be based on an sRGB color space.

Particular embodiments of the subject matter described in this specification can be implemented to realize one or more of the following advantages. Users can be enabled to seamlessly mix input-referred and output-referred content. Realistic visual effects and compositing workflows can be enabled with no additional knowledge required on the part of users. All, some, or none of these advantages may be applicable to various embodiments.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
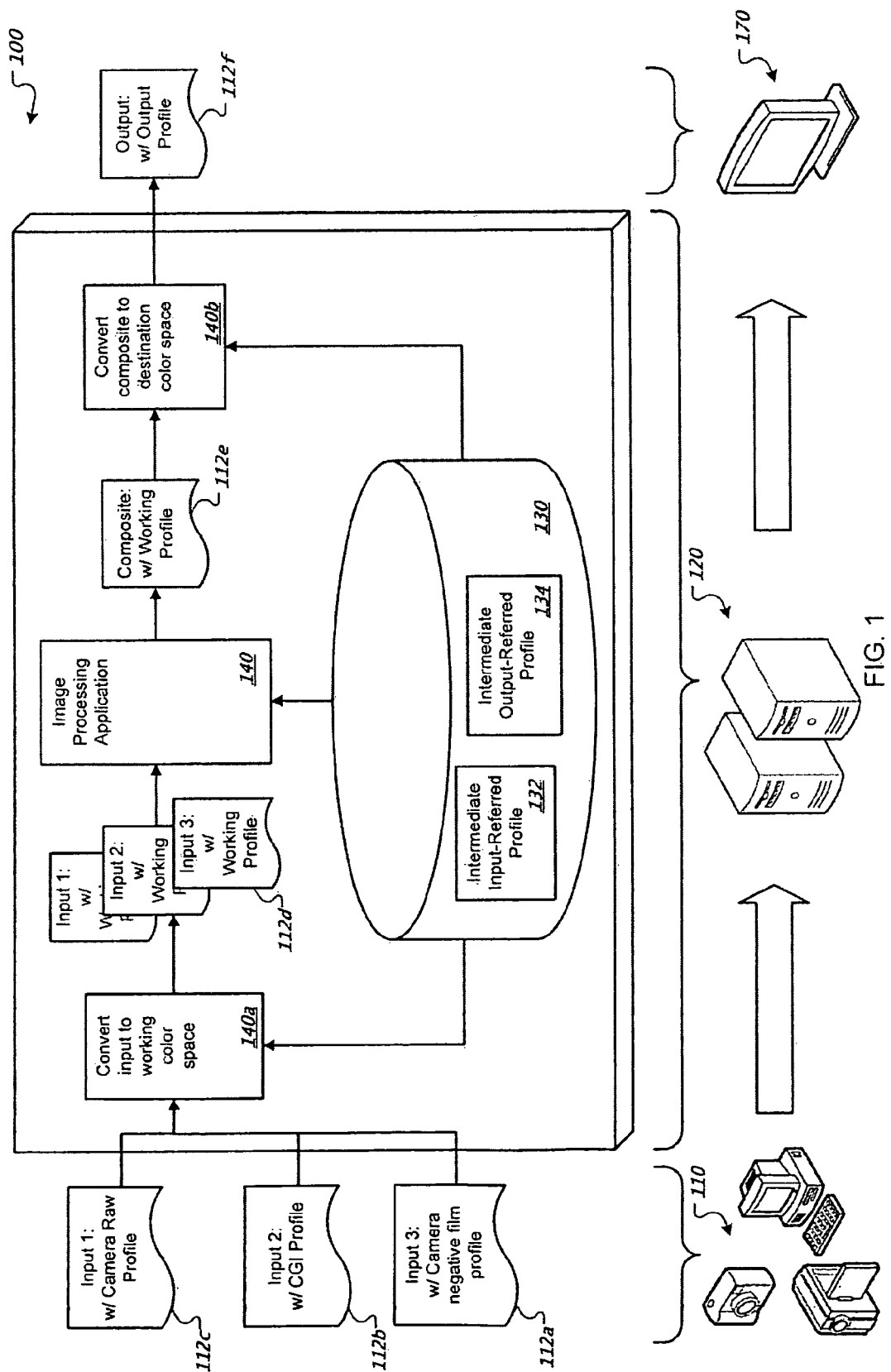
FIG. 1 is a block diagram showing an example workflow that uses profile replacement in the rendering and un-rendering of image data.

FIG. 1 is a block diagram 100 showing an example workflow that uses profile replacement in the rendering and un-rendering of image data. Generally, the image processing system 120 obtains input image data 112a-c from input devices 110, manipulates the input image data 112a-c using an image processing application 140, and makes output image data 112f available for output to output device 170. The image processing application 140 and the conversion modules 140a and 140b perform rendering and un-rendering using the intermediate input-referred and output-referred profiles 132 and 134.

Input device(s) 110 (e.g.; scanner, digital camera, video camera, etc.) generate image data 112. The input device 110 can be local or remote, and can be connected to a personal computer or other output device via a network, wireless link, cable, or system bus. Moreover, the input device 110 can be integrated into a composite device, such as a printer/scanner that includes a processor or a portable digital assistant (PDA). The input device 110 can be used in a variety of imaging workflows. For example, the input device 110 can provide image data 112 for preview (e.g., proofing), compositing, editing, and the like.

Image data 112 can exist in many different file or electronic document formats. For example, Bitmaps (BMP, developed by Microsoft Corporation of Redmond, Wash.), Graphics Interchange Format (GIF, developed by CompuServe of Columbus, Ohio), Tagged Image File Format (TIFF, developed by Adobe Systems Incorporated of San Jose, Calif.), Joint Photographic Experts Group (JPEG, developed by Joint Photographic Experts Group), Extended Dynamic Range Image File Format (OpenEXR, developed by Industrial Light and Magic of San Francisco, Calif.), etc. Furthermore, the image data 112 can represent various color spaces. Example color spaces include, but are not limited to, sRGB, CMYK, Adobe RGB, CIE LAB, and the like. Color profiles, such as for example ICC profiles, can be used to identify the color spaces associated with image data 112. Some formats, such as OpenEXR, encode the chromaticity values directly in the file, without an ICC Profile. The color profile can be embedded in the same file(s) as the image data 112 or can be separate. In addition to identifying the color space, each associated color profile can define the image state associated with the image data (e.g., output-referred or scene-referred) and can be used to convert image data 112 to a profile connection space, such as CIE XYZ. It should be noted that image state information can be specified for both scene-referred and output-referred situations (e.g., an image can have two associated color profiles, a first with a scene-referred image state tag and a second with an output-referred image state tag). It should also be noted that a color profile does not need to be embedded with the image data 112. The color space and/or image state associated with image data 112 can be implicit in the format of image data 112 or can be predetermined using, for example, the source of the data or a work flow being used.

Typically, the image data 112 is maintained in a low dynamic range (LDR) or a high dynamic range (HDR). Dynamic range is a ratio used to specify the difference between the highest and lowest values that can be represented and is typically measured in luminance (i.e., candelas per square meter). The range of luminance values that the human eye can distinguish is large. For example, the luminance value of starlight is 0.001 cd/m2, while the luminance value of a sunlit room can be 100.000 cd/m2.

A dynamic range for a scene can be defined by measuring the darkest and brightest parts of a scene. For example, it is possible for a scene to have a dynamic range of 100,000:1. A camera's dynamic range can be defined by measuring the intensity that just saturates the camera to the intensity that just lifts the camera response one standard deviation above camera noise. For example, commonly available digital cameras have a dynamic range of about 1000:1. A display device's dynamic range can be defined by measuring maximum and minimum intensities emitted from the display device.

LDR image data is typically represented using 8-bit, 16-bit, and 24-bit image data. HDR image data is typically represented by 32-bit floating point values. Scene-referred data is frequently captured in HDR. In other words, the data is prepared so as to be proportional to relative luminance among objects in a scene depicted in the image. HDR image data often remains proportional to light values (i.e., they use linear values). Before being output, scene-referred HDR images can be rendered to output-referred LDR images, which can involve, in addition to subject matter disclosed herein, gamut mapping using a variety of techniques such as perceptual, relative, or absolute rendering.

The image processing system 120 converts, edits, and combines image data 112 to create an output image 112f for output device 170. Generally, the image processing system 120 has a data store 130 and an image processing application 140. The data store 130 stores intermediate input-referred profile 132 and intermediate output-referred profile 134. The image processing application 140 uses the intermediate profiles 132 and 134 in rendering and un-rendering the image data 112. Rendering and/or un-rendering also can be performed in the conversion modules 140a or 140b.

Intermediate input-referred profile 132 and intermediate output-referred profile 134 are a pair of complementary profiles in that they provide different interpretations of the same image data 112. One example of a complementary profile pair is HDTV/sRGB. HDTV is an input-referred color space defined in International Telecommunication Union Radiocommunication Sector Recommendation BT.709 ("Rec. 709") that is suited for video recording. Rec. 709 defines tone response curves and primaries associated with the color space. sRGB is an output-referred color space that uses the same primary colors as those defined in Rec. 709 that is suited for computer display and television monitors. Essentially, sRGB decodes standard HDTV image data to viewing room colorimetry. The two color spaces share the same gamut. Image data associated with HDTV is virtually indistinguishable from image data associated with sRGB. An HDTV profile applied to image data can produce input-referred image data, and the sRGB profile applied to the same image data can produce output-referred image data. The primary difference between the sRGB and HDTV is the gamma curve applied to the image data when interpreting that data. Data can be transformed from the sRGB to the HDTV color space by associating the HDTV profile with the image data instead of the sRGB color profile. The reverse can also be performed. Other complementary profiles exist and can be used as the intermediate profiles 132 and 134. For example, some camera negative profiles are complementary to some theater preview profiles. The Kodak 5218 Camera Negative Film (by Adobe) profile and the Kodak 2393 Theater Preview (by Adobe) profile provide different interpretations of the same Digital Picture Exchange (DPX) film data.

The output device(s) 170 (e.g., a monitor, a printer, a projector, etc.) display or print images. The output device 170 can be local or remote, and can be connected to a personal computer or other device via a network, wireless link, cable, or system bus. Moreover, the output device 170 can be integrated into a composite device, such as a printer/scanner that includes a processor or a portable digital assistant (PDA). The output device 170 can be used in a variety of imaging workflows. For example, the output device 170 can receive image data 112 for preview (e.g., proofing), and from compositing, editing, and the like.

In operation, system 120 receives input image data 112a-c. In this example, input data 112a are generated from a video camera input device 110 and are associated with a camera negative film color profile. Input data 112b are computer-generated using a computing input device 110 and are associated with a computer-generated imagery (CGI) profile. Input data 112c are generated using a digital camera input device 110 and are associated with a camera raw profile. Input data 112a and 112c are associated with an input-referred image state, and input data 112b are associated with an output-referred image state. Image data 112 can be associated with many other color profiles and image states.

Upon receiving the image data 112a-c, the conversion module 140a converts the input data to working space image data 112d so that all input data can be in a common color space for compositing, editing, and/or previewing. A user of the system 120 can determine which color space is used for the working space, which can be a variety of color spaces including sRGB, HDTV (Rec. 709), camera negative film (e.g., Kodak 5205 or Kodak 5218), and theater preview (e.g., Fujifilm 3510 or Kodak 2393), to name a few. The working space can be input-referred or output-referred.

When the working space and the source color space are associated with different image states, the conversion module 140a can utilize intermediate color profiles 132 and 134. If the input image data 112 is input-referred and the working space is output-referred, then the conversion module can convert the image data to an intermediate input-referred color space. The converted image data is associated with the intermediate input-referred color profile. A rendering operation can be performed by disassociating the image data from the intermediate input-referred color profile and by associating the image data with a complementary intermediate output-referred color profile. Some portion of the overall rendering, such as gamut mapping, can occur when the image data is converted to the intermediate input-referred color space. After replacing the intermediate input-referred color profile with the intermediate output-referred color profile, the image data can be further transformed into the destination work space using the intermediate output-referred color profile and the work space color profile. A similar un-rendering can be performed if the input image data 112 is output-referred and the work space is input-referred. The output-referred image data 112 can be converted to the intermediate output-referred color space, un-rendered by replacing the intermediate output-referred color profile with the intermediate input-referred color profile, and finally converting to the destination input-referred work space.

In this example, the working space can be a theater preview color space, such as Kodak 2393 Theater Preview by Adobe, and the intermediate input-referred and output-referred profiles 132 and 134 can be the HDTV and sRGB profiles, respectively. Transforming the camera raw input data 112c to work space image data 112d can be accomplished by converting from the camera raw color space to the HDTV color space. This conversion can involve gamut mapping and other techniques used to convert from one color space to another. Both the camera raw color profile and the HDTV color profile can be used to facilitate the conversion. After the conversion to HDTV, which is the input-referred color space profile, a rendering to the complementary sRGB output-referred color profile can be performed by associating the sRGB profile with the image data obtained from the camera raw-to-HDTV conversion. The image data can then be transformed into the working space color space using the sRGB profile and the working space color profile, which in this example is the Kodak 2393 Theater Preview profile. In this example, the rendering operation includes a gamma adjustment. The gamma adjustment can be accomplished by replacing an associated HDTV profile with the sRGB profile and vice-versa. Gamma adjustment and other types of rendering operations can be performed using other complementary pairs in the replacement. The rendering operation can be much more complex than a simple gamma adjustment. For example, the Kodak 5218/2393 profiles can have a combination of one- and three-dimensional tables to perform rendering.

The work space image data 112d can be further manipulated, edited, composited, and previewed by image processing application 140. Such manipulations may include further conversions, renderings, and un-renderings in manners similar to those previously described. The image processing application 140 can create composite image data 112e that combines all of the edited work space image data 112d. The composite image data 112e can be converted to output image data 112f using conversion module 140b, which can operate in a manner similar to the conversion module 140a described previously.

As shown, rendering and un-rendering using intermediate, complementary color profile replacement can be performed in a variety of situations and modules to facilitate the conversion of image data from an input-referred image state to an output-referred image state using intermediate color profiles and a replacement operation. The reverse (from output-referred to input-referred) is similarly accomplished in a variety of situations and modules. One potential benefit is the enabling of users to seamlessly mix input-referred and output-referred content. Realistic visual effects and compositing workflows can be enabled with no additional knowledge required on the part of users. All, some, or none of these advantages may be applicable to various embodiments.

Figure 2:
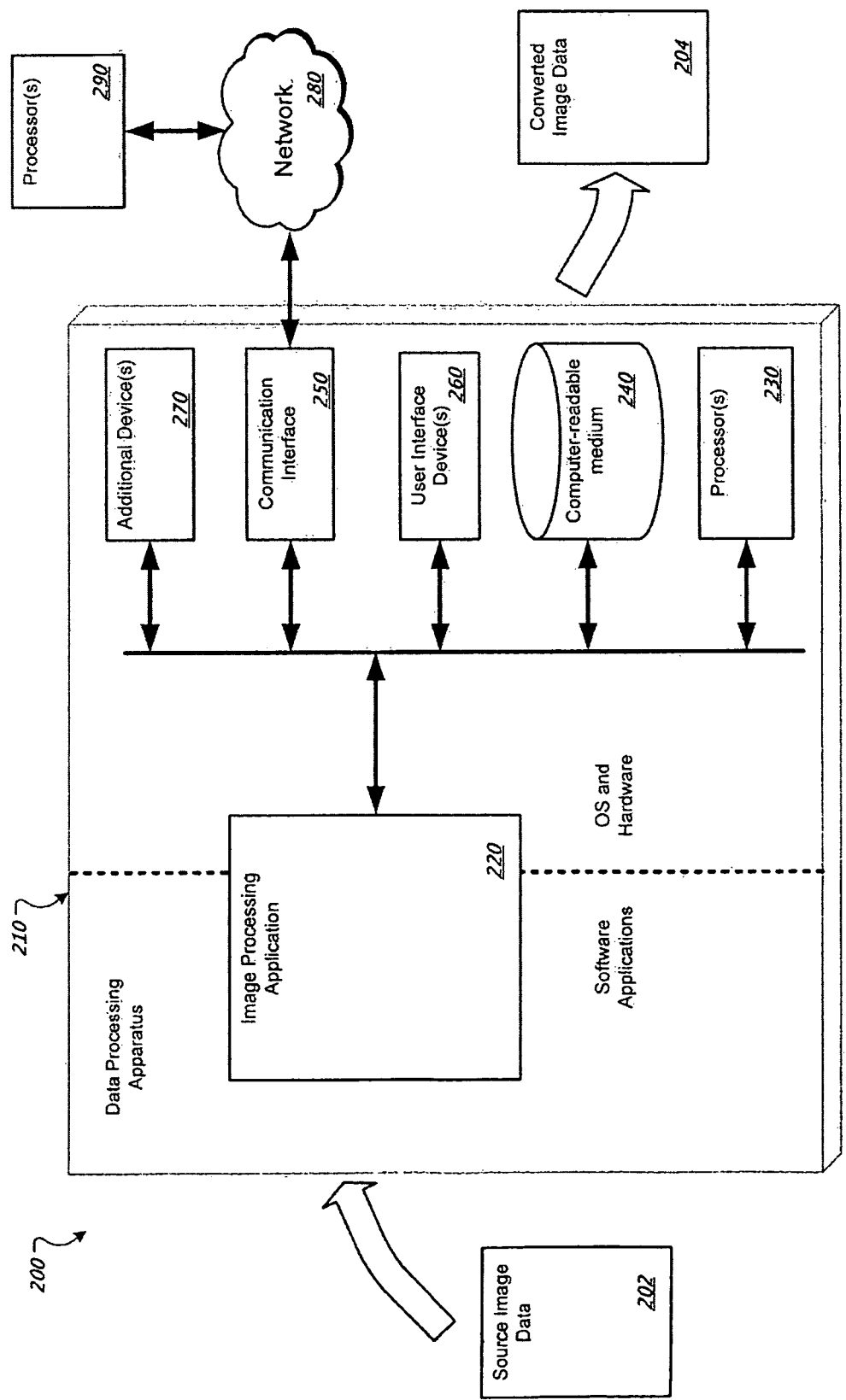
FIG. 2 shows an example system configured to render and un-render image data using profile replacement.

FIG. 2 shows an example system 200 configured to render and/or un-render image data using profile replacement. In general, the data processing apparatus 210 can obtain input source image data 202, manipulate it, and make available for output the resulting converted image data 204. A data processing apparatus 210 can include hardware/firmware, an operating system and one or more applications, including an image processing application 220. As used herein, an application refers to a computer program that the user perceives as a distinct computer tool used for a defined purpose. An application 220 can be built entirely into the operating system (OS) of the data processing apparatus 210, or an application 220 can have different components located in different locations (e.g., one portion in the OS or kernel mode, one portion in the user mode, and one portion in a remote server), and an application 220 can be built on a runtime library serving as a software platform of the apparatus 210. Moreover, an application 220 can be a graphical user interface application (e.g., a Web browser) that connects to one or more processors 290 (e.g., one or more Web servers) over a network 280 and provides the computer tool as a network service.

The image processing application 220 can include visual effects software (e.g., Adobe® After Effects® software, available from Adobe Systems Incorporated of San Jose, Calif.), image editing software (e.g., Adobe® Photoshop® software, available from Adobe Systems Incorporated of San Jose, Calif.), and video editing software (e.g., Adobe® Premiere® software, available from Adobe Systems Incorporated of San Jose, Calif.). Thus, the image processing application 220 can operate on digital images from many different sources. Moreover, a digital image (which for brevity will simply be referred to as an image or image data) does not necessarily correspond to a file. An image may be stored in a portion of a file that holds other images, in a single file dedicated to the image in question, or in multiple coordinated files. In addition, as used herein, an image can include multiple images; thus, "an image" includes video imagery in addition to still images.

The data processing apparatus 210 includes one or more processors 230 and at least one computer-readable medium 240. The at least one computer-readable medium 240 can include a random access memory (RAM), a program memory (for example, a writable read-only memory (ROM) such as a flash ROM), a hard drive, and a removable disk drive (e.g., a floppy disk, compact disk (CD), or digital versatile disk (DVD) drive). All such computer readable media can be suitable for storing executable or interpretable computer programs, including programs embodying aspects of the subject matter described in this specification.

In addition, the data processing apparatus 210 can include a hard drive controller, a video controller, and an input/output (VO) controller coupled by a system bus. The apparatus 210 can be preprogrammed, in ROM, for example, or it can be programmed (and reprogrammed) by loading a program from another source (for example, from a floppy disk, a CD-ROM, DVD, or another computer).

The data processing apparatus 210 can also include one or more input/output (I/O) interface devices, such as a communication interface 250, one or more user interface devices 260, and one or more additional devices 270. The I/O interface devices can be coupled with one or more I/O controllers in the apparatus 210 through one or more I/O buses, and the I/O interface devices can receive and transmit data (e.g., stills, pictures, movies, and animations for importing into a composition) in analog or digital form over communication links such as a serial link, local area network, wireless link, and parallel link. The user interface device(s) 260 can include display screen(s), keyboard(s) (e.g., a custom video editing keyboard), mouse, stylus, or any combination thereof. Moreover, the data processing apparatus 210 can itself be considered a user interface device (e.g., when the image processing application 220 is delivered as a Web service).

The additional device(s) 270 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium.

Once programmed in accordance with the disclosed subject matter, the data processing apparatus 210 is operable to render and/or un-render image data using profile replacement.

Figure 3:
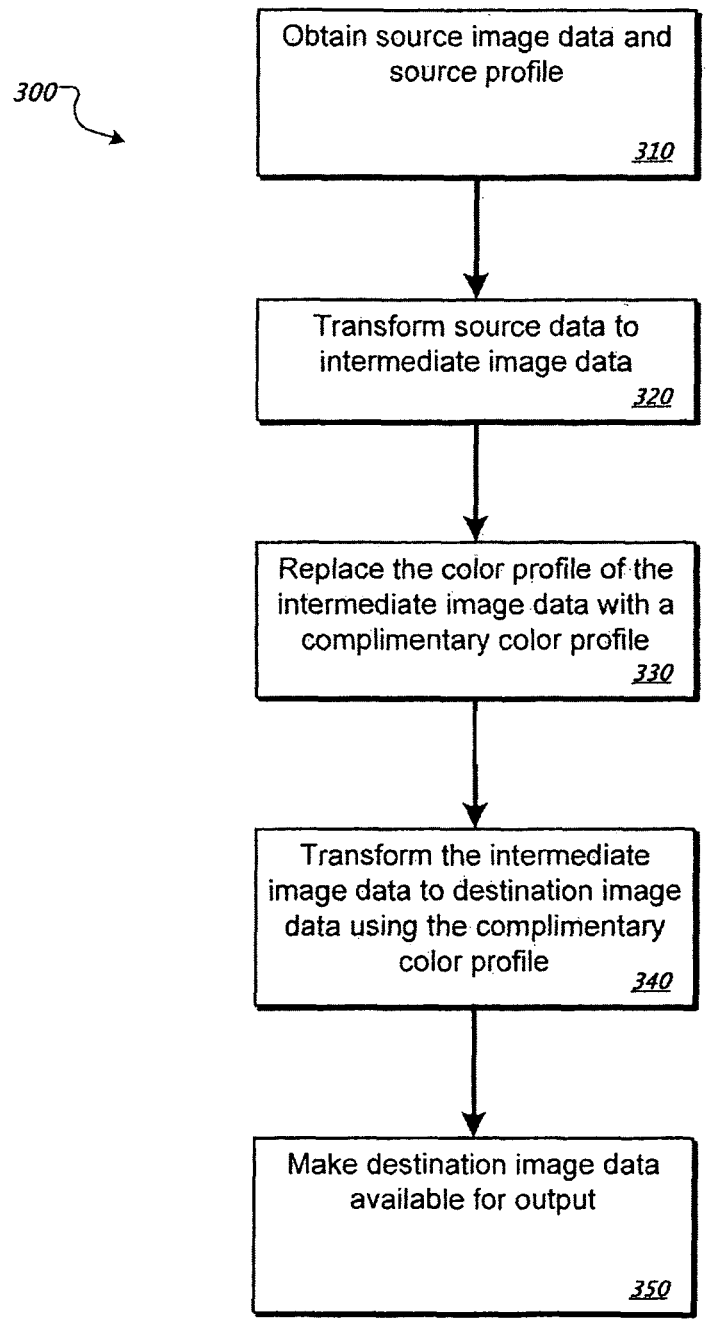
FIG. 3 shows an example process of rendering or un-rendering image data using profile replacement.

FIG. 3 shows an example process 300 of rendering or un-rendering image data using profile replacement. Source image data and color profile information is obtained 310. The source image data can conform to any of a variety of image and/or video formats. These include, to name a few, Portable Document Format (PDF), JPEG, TIFF, Moving Picture Experts Group-2 (MPEG-2), etc. The image data can be associated with a source color profile and an image state, such as input-referred or output-referred.

When the destination color space and the source color space are associated with different image states, the image data associated with the source color profile can be transformed 320 to intermediate image data associated with an intermediate color profile. Depending on the image state of the source data and the image state of the destination color space, the intermediate color profile used can differ. For example, if the source data image state is output-referred and the destination color space is input-referred, then the source image data can be transformed to intermediate image data and associated with an intermediate output-referred color profile. Similarly, if the source data image state is input-referred and the destination color space is output-referred, then the source data can be transformed to intermediate image data and associated with the intermediate input-referred color profile. Some rendering operations, such as gamut mapping can also be performed.

The intermediate color profile associated with the intermediate image data can be replaced 330 with an intermediate color profile that complements it. For example, if the intermediate color profile is input-referred, it can be replaced with a similar color profile that is output-referred. Likewise, an intermediate output-referred color profile can be switched with a complementary intermediate input-referred color profile. One example of complementary color profiles is HDTV and sRGB, which differ by their respective gamma curves and image states. The switching of the color profiles provides a rendering (from input-referred to output-referred) or un-rendering (from output-referred to input-referred) operation on the intermediate image data.

The intermediate image data, which is associated with the complementary color profile, can be transformed 340 into destination image data. The destination image data can conform to any of a variety of image and/or video formats. The image state of the destination image data can be opposite that of the image state of the source image data. For example, if the source image state is input-referred or scene-referred, the destination image can be output-referred. Conversion from the intermediate image data to the destination image data can be facilitated by the intermediate complementary color profile and the destination color profile. The destination image data is made available 350 for output. This can include storing the data on a computer-readable medium, sending the image data directly to an output device, or sending the image data to another program for use, performing any other downstream processing of the data.

Figure 4:
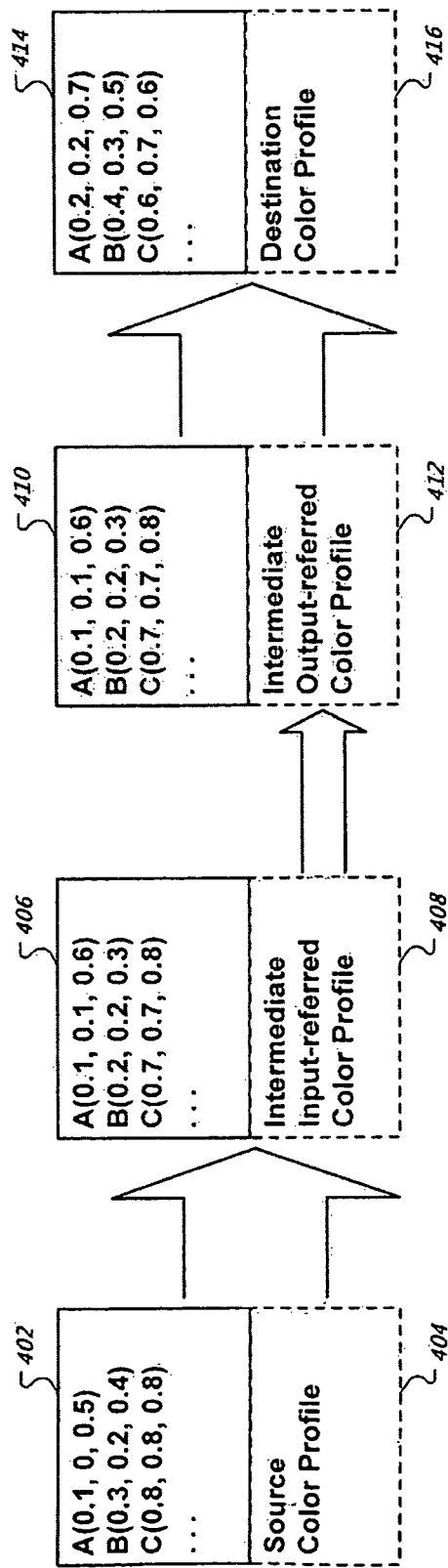
FIG. 4 shows an example rendering of image data using profile replacement.

FIG. 4 is a flow diagram of an example rendering of image data using profile replacement. In general, source image data 402 is transformed into destination image data 414 using profile replacement of intermediate complementary profiles 408 and 412 when the source image data 402 and the destination image data 414 have different image states. The source image data 402 is associated with a source color profile 404. This source image data 402 can be input-referred. The source image data 402 is transformed into intermediate image data 406 associated with an intermediate input-referred color space 408. The transformation can be performed using the source color profile 404 and the intermediate input-referred color profile 408.

A rendering operation can be performed on the intermediate image data 406 by replacing the associated intermediate input-referred color profile 408 with an intermediate output-referred color profile 412. As is demonstrated in the figure, the intermediate image data 406 is the same as the intermediate image data 410, with the only difference between the two being the color profile that is associated with each. Intermediate image data 406 is associated with intermediate input-referred color profile 408 and intermediate image data 410 is associated with intermediate output-referred color profile 412. The intermediate image data 410 can then be converted to destination image data 414 using the intermediate output-referred color profile 412 and the destination color profile 416.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method comprising:
   obtaining source image data that is source input-referred color space;
   transforming, by one or more data processing apparatus, the source image data to intermediate image data associated with an intermediate input-referred color profile;
   selecting an intermediate output-referred color profile based on the intermediate output-referred color profile being complementary to the intermediate input-referred color profile;
   applying, by the one or more data processing apparatus, a rendering operation to the intermediate image data by associating the intermediate image data with the intermediate output-referred color profile;
   transforming, by the one or more data processing apparatus, the intermediate image data to destination image data associated with a destination output-referred color space using the intermediate output-referred color profile; and
   making available for output the destination image data via an output device.

2. The method of claim 1, wherein the intermediate input-referred color profile and the intermediate output-referred color profile differ by gamma curves associated with each, and wherein the destination output-referred color space is selected based on a current task in an imaging workflow.

3. The method of claim 2, wherein the imaging workflow is one of: a digital cinema workflow, a video workflow, and a camera negative workflow.

4. The method of claim 1, wherein the intermediate input-referred color profile is based on a High-Definition Television color space defined in an International Telecommunication Union Radiocommunication Sector Recommendation BT.709, and the intermediate output-referred color profile is based on an sRGB color space.

5. The method of claim 1, wherein the intermediate input-referred color profile and the intermediate output-referred color profile are International Color Consortium profiles.

6. A computer implemented method comprising:
   obtaining source image data associated with a source output-referred color space;
   selecting an intermediate input-referred color profile based on the intermediate input-referred color profile being complementary to the intermediate output-referred color profile;
   applying, by the one or more data processing apparatus, an un-rendering operation to the intermediate image data by associating the intermediate image data with the intermediate input-referred color profile;
   transforming, by the one or more data processing apparatus, the intermediate image data to destination image data that is destination input-referred color space using the intermediate input-referred color profile; and
   making available for output the destination image data via an output device.

7. The method of claim 6, wherein the intermediate input-referred color profile and the intermediate output-referred color profile differ by gamma curves associated with each, and wherein the destination output-referred color space is selected based on a current task in an imaging workflow.

8. The method of claim 6, wherein the intermediate input-referred color profile is based on a High-Definition Television color space defined in an International Telecommunication Union Radiocommunication Sector Recommendation BT.709, and the intermediate output-referred color profile is based on an sRGB color space.

9. A computer program product, comprising computer program instructions encoded on a computer-readable medium, operable to cause data processing apparatus to perform operations comprising:
   obtaining source image data that is source input-referred color space;

transforming the source image data to intermediate image data associated with an intermediate input-referred color profile;

applying a rendering operation to the intermediate image data by associating the intermediate image data with an intermediate output-referred color profile, wherein the intermediate output-referred color profile is selected for association with the intermediate image data based on the intermediate output-referred color profile being complementary to the intermediate input-referred color profile;

transforming the intermediate image data to destination image data associated with a destination output-referred color space using the intermediate output-referred color profile; and making available for output the destination image data via an output device.

10. The product of claim 9, wherein the intermediate input-referred color profile and the intermediate output-referred color profile differ by gamma curves associated with each, and wherein the destination output-referred color space is selected based on a current task in an imaging workflow.

11. The product of claim 10, wherein the imaging workflow is one of: a digital cinema workflow, a video workflow, and a camera negative workflow.

12. The product of claim 9, wherein the intermediate input-referred color profile is based on a High-Definition Television color space defined in an International Telecommunication Union Radiocommunication Sector Recommendation BT.709, and the intermediate output-referred color profile is based on an sRGB color space.

13. The product of claim 9, wherein the intermediate input-referred color profile and the intermediate output-referred color profile are International Color Consortium profiles.

14. A computer program product, comprising computer program instructions encoded on a computer-readable medium, operable to cause data processing apparatus to perform operations comprising:

obtaining source image data associated with a source output-referred color space;

transforming the source image data to intermediate image data associated with an intermediate output-referred color profile;

applying an un-rendering operation to the intermediate image data by associating the intermediate image data with an intermediate input-referred color profile, wherein the intermediate input-referred color profile is selected for association with the intermediate image data based on the intermediate input-referred color profile being complementary to the intermediate output-referred color profile;

transforming the intermediate image data to destination image data that is destination input-referred color space using the intermediate input-referred color profile; and making available for output the destination image data via an output device.

15. The product of claim 14, wherein the intermediate input-referred color profile is based on a High-Definition Television color space defined in an International Telecommunication Union Radiocommunication Sector Recommendation BT.709, and the intermediate output-referred color profile is based on an sRGB color space.

16. A system comprising:

an output device; and one or more data processing apparatuses operable to interact with the output device and to perform operations comprising:

obtaining source image data that is source input-referred color space;

transforming the source image data to intermediate image data associated with an intermediate input-referred color profile;

applying a rendering operation to the intermediate image data by associating the intermediate image data with an intermediate output-referred color profile, wherein the intermediate output-referred color profile is applied because the intermediate output-referred color profile is complementary to the intermediate input-referred color profile, wherein complementary refers to sharing a same gamut;

transforming the intermediate image data to destination image data associated with a destination output-referred color space using the intermediate output-referred color profile; and making available the destination image data for output via the output device.

17. The system of claim 16, wherein the intermediate input-referred color profile and the intermediate output-referred color profile differ by gamma curves associated with each, and wherein the destination output-referred color space is selected based on a current task in an imaging workflow.

18. The system of claim 17, wherein the imaging workflow is one of: a digital cinema workflow, a video workflow, and a camera negative workflow.

19. The system of claim 16, wherein the intermediate input-referred color profile is based on a High-Definition Television color space defined in an International Telecommunication Union Radiocommunication Sector Recommendation BT.709, and the intermediate output-referred color profile is based on an sRGB color space.

20. The system of claim 16, wherein the intermediate input-referred color profile and the intermediate output-referred color profile are International Color Consortium profiles.

21. The system of claim 16, the operations further comprising:

obtaining source image data associated with a source output-referred color space;

transforming the source image data to intermediate image data associated with an intermediate output-referred color profile;

applying an un-rendering operation to the intermediate image data by associating the intermediate image data with an intermediate input-referred color profile;

transforming the intermediate image data to destination image data that is destination input-referred color space using the intermediate input-referred color profile; and making available the destination image data for output via the output device.

* * * * *